United States Patent
Cooper et al.

[15] 3,707,632
[45] Dec. 26, 1972

[54] RADIATION DOSIMETER HAVING TWO IONIZATION CHAMBERS WITH DIFFERENT RATIOS OF NEUTRON TO GAMMA RADIATION RESPONSES

[72] Inventors: Paul Neville Cooper, Sutton Coldfield; Bryan John Tymons, Berrick Prior, near Benson, both of England

[73] Assignee: R. A. Stephen & Company Limited, Surrey, England

[22] Filed: Nov. 30, 1970

[21] Appl. No.: 93,700

[30] Foreign Application Priority Data

Dec. 2, 1969    Great Britain.....................58,857/69

[52] U.S. Cl..............................250/83.3 PD, 250/83.1
[51] Int. Cl..............................G01t 1/14, G01t 3/00
[58] Field of Search.....................250/83.1, 83.3 PD

[56] References Cited

UNITED STATES PATENTS 2,638,553  5/1953  Landsverk et al. .........250/83.3 PD X
2,841,716  7/1958  Rich .............................250/83.3 PD
3,110,808  11/1963  Fauser et al. ..................250/83.3 PD Primary Examiner—Archie R. Borchelt
Attorney—Holcombe, Wetherill & Brisebois

[57] ABSTRACT

An ionization dosimeter includes two ionization chambers having different ratios of neutron radiation response to gamma radiation response. One pair of corresponding electrodes of the two chambers are connected directly together. The other pair of corresponding electrodes are coupled through a capacitance. The two chambers are electrically charged in opposite polarities so that the change in potential across the capacitance is proportional to the difference between the responses of the two chambers. The value of the coupling capacitance can be chosen so that the potential represents either the effective biological radiation dose, or the neutron radiation dose.

10 Claims, 3 Drawing Figures

PATENTED DEC 26 1972

3,707,632

RADIATION DOSIMETER HAVING TWO IONIZATION CHAMBERS WITH DIFFERENT RATIOS OF NEUTRON TO GAMMA RADIATION RESPONSES

This invention relates to ionization dosimeters responsive to neutron radiation or to both neutron and gamma radiation and has for its object the provision of a neutron dosimeter in which at least partial compensation for gamma dosage may be obtained.

In practice, neutron radiation is always accompanied by some gamma radiation, so that it is difficult to discriminate between the two forms of radiation or to measure the effective biological dose in a mixed radiation field.

The need for discrimination is due to the differing biological effectiveness or quality factor of neutron and gamma radiation. Total ionization is proportional to the dose in rads, whereas biological damage is proportional to the dose in rems (rads multiplied by quality factor). The ionization produced by a mixed radiation field cannot therefore be a measure of biological dose. For fast neutrons, with energies in the range of 0.1 Mev to 15 Mev, a dosimeter needs to be some 6 to 10 times more sensitive to neutrons than to gamma radiation if the ionization is to represent biological dosage. Because of the widely different inter-action cross-sections of nuclei for fast neutrons and for gamma radiation it has not been found possible to achieve the required ratio of sensitivities in a single dosimeter.

Previously, two dosimeters have therefore been used, a first being sensitive both to neutrons and to gamma radiation and a second being sensitive mainly to gamma radiation. The neutron dose is found by subtracting the gamma dose measured by the second dosimeter from the (neutron + gamma) dose measured by the first. This arrangement requires relatively bulky apparatus and is liable to error in the making and subtraction of the two readings.

According to the present invention there is provided an ionization dosimeter including two ionization chambers with substantially different ratios of neutron radiation response to gamma radiation response, one pair of corresponding electrodes of the two chambers being electrically connected together and the remaining pair of corresponding electrodes being coupled through a coupling capacitance and the two chambers being arranged to be electrically charged in opposite polarities so that the potential appearing across said coupling capacitance is proportional to the difference between the responses of the two chambers to received radiation, together with means for indicating the magnitude of the change in voltage between the electrodes of that one of said chambers which has the greater ratio of neutron-radiation to gamma-radiation sensitivity.

Preferred features and advantages of ionization dosimeters according to the invention will become apparent from the following description of embodiments thereof, taken in conjunction with the accompanying drawing, comprising FIGS. 1 to 3, of which:

Figure 1:
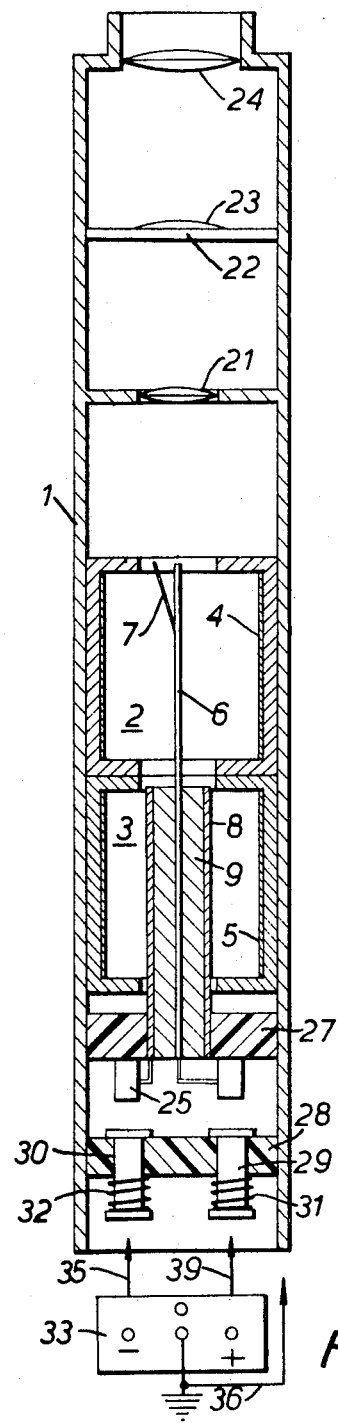
FIG. 1 is a partial longitudinal cross-section through one embodiment of a dosimeter according to the invention.

A dosimeter according to the invention includes two ionization chambers which are arranged to have mutually different ratios of neutron response to gamma radiation response. The two chambers are arranged to be excited in opposite polarities, so that the electric fields within them are opposed.

A direct connection is made between one electrode of each chamber and the corresponding electrode of the other. The remaining pair of corresponding electrodes are capacitively coupled. Owing to the opposed polarities of the two chambers the capacitively coupled electrodes collect charge carriers of opposite sign, so that the nett charge collected on the isolated electrode is the difference between the charges produced in the two chambers. The potential appearing on the isolated electrode is therefore proportional to the charge difference.

If equal charges are collected in the two chambers the change in the potential of the isolated electrode is zero. For unequal charges the electrode potential does change, the potential in the chamber giving the smaller charge being increased and that in the chamber giving the greater charge being decreased.

The charge difference is stored in the capacitance connected between the two chambers. A conventional quartz-fiber electroscope is provided in the chamber which has the greater ratio of neutron radiation to gamma-radiation sensitivity and the indication of this electroscope gives a measure of the overall potential change.

It is possible to select for the coupling capacitance connected between the electrodes a value such that the reading obtained is proportional to the effective biological dose in a mixed radiation field. Alternatively, the value of the coupling capacitance may be chosen to give complete cancellation of potential charges, in the chamber which is more sensitive to neutron radiation, which is due to the gamma radiation dose, thus giving a reading which is proportional to the neutron dose only.

To obtain a true measure of biological dose in a known mixed radiation field the value $C_t$ of the coupling capacitance is given by the equation:

$$C_t = \frac{C_2 \left(QF \dfrac{q_{1\gamma}}{q_{1n}} - \right)}{1 + QF \dfrac{q_{1\gamma}}{q_{1n}} \left(\dfrac{q_{2\gamma}}{q_{1\gamma}} - 1\right) - \dfrac{q_{2n}}{q_{1n}}}$$

where $C_2$ is the capacitance of the chamber having the lower sensitivity to neutrons;

$q_{2\gamma}$ is the charge sensitivity to gamma radiation of that chamber;

$q_{2n}$ is the charge sensitivity to neutron radiation of that chamber;

$q_{1\gamma}$ is the charge sensitivity to gamma radiation of the chamber which is more sensitive to neutron radiation;

$q_{1n}$ is the charge sensitivity to neutron radiation of that chamber; and $QF$ is the quality factor of the neutron radiation in said field.

The value $C_c$ of the coupling capacitance required for complete compensation of the gamma radiation dose is given by:

$$C_c = C_2/[(q_{2\gamma}/q_{1\gamma}) - 1]$$

The neutron response of the chamber with the greater ratio of neutron to gamma sensitivity is given $$\frac{q_{1n}}{C_1} \left[ \frac{\frac{C_1}{C_2} + \frac{C_1}{C_c} - \frac{C_1}{C_2} \frac{q_{2n}}{q_{1n}}}{\frac{C_1}{C_2} + \frac{C_1}{C_c} + 1} \right]$$

or $$\frac{q_{1n}}{C_1} \left[ \frac{C_o C_1 + C_1 C_2 - C_1 C_c \frac{q_{2n}}{q_{1n}}}{C_o C_1 + C_o C_2 + C_1 C_2} \right]$$

or $$\frac{q_{1n}[C_c + C_2] - C_c q_{2n}}{C_o C_1 + C_c C_2 + C_1 C_2}$$

where $C_1$ is the capacitance of that chamber and the remaining symbols have the meanings already stated.

This compares with the neutron sensitivity $q_{1n}/C$ of the uncompensated chamber.

FIG. 1 illustrates an embodiment of the invention in which the isolated electrodes of the two chambers are capacitively coupled.

The device shown includes a casing 1 surrounding two coaxially disposed cylindrical ionization chambers 2, 3. Chamber 2 has a wall coating 4 rendering the chamber preferentially sensitive to neutron radiation, while chamber 3 has a coating 5 which makes it preferentially sensitive to gamma radiation. The isolated axial electrode 6 of chamber 2 the measuring electroscope 7. This electrode also passes through chamber 3, within which it is surrounded by a second electrode 8 supported by a dielectric cylinder 9. When the device is charged, electrode 6 is connected to a source of potential which is positive with respect to the earthed casing 1 of the device. A source of potential negative with respect to earthed casing 1 of the device is connected to the electrode 8 which may be a conductive layer applied to the outer surface of the dielectric cylinder 9 surrounding electrode 6 within chamber 3.

The dosimeter includes a conventional optical system for viewing the electroscope and some convenient arrangement for charging the isolated electrodes of the ionization chambers.

As shown in FIG. 1, the optical system comprises a projection lens 21 by which an image of the electroscope 7 is projected upon a translucent member 22 carrying a measuring graticule 23. The position of the image of the movable member of electroscope 7 upon graticule 23 may be viewed by an observer through an eyepiece 24. The charging means for isolated electrodes 6 and 8 conveniently includes a pair of posts 25, 26 mounted upon an insulator 27 which is fixed within casing 1 and supports the two isolated electrodes. Post 25 is connected to electrode 6 and post 26 to electrode 8. A further insulator 28 fixed within casing 1 carries two studs 29, 30 which are slidably mounted in insulator 28 and are resiliently biased outwardly of casing 1 by respective springs 31, 32. A d.c. source 33 provides at terminal + and − voltages which are respectively positive and negative with respect to earth. Contact members represented diagrammatically by arrows 34 and 35 are connected respectively to the positive and negative terminals of source 33 and are arranged to make contact with studs 29, 30 and to urge these studs into contact with posts 25, 26, thereby establishing electrical connection between the source terminals and electrodes 6, 8. At the same time an earthed contact member 36 makes contact with casing 1 to establish the correct charging conditions within the dosimeter.

Thus charge transference due to ionization produced within chamber 2 in response to neutron radiation will tend to reduce the positive potential of electrode 6, while charge transference in chamber 3 due to gamma radiation will tend to increase the positive potential of this electrode. The amount of compensation will depend upon the value of the coupling capacitance, which in this embodiment is constituted by the capacitance between electrode 6 and the conducting surface layer 8 upon dielectric sheath 9.

Figure 2:
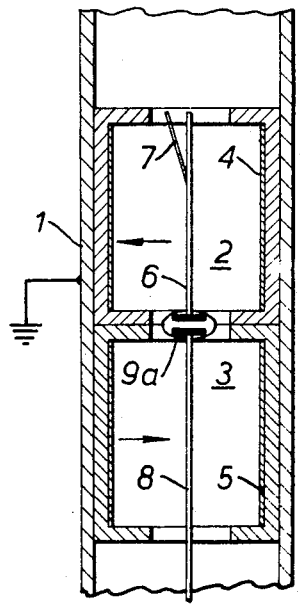
FIG. 2 is a similar view of another embodiment of the invention.

In the embodiment shown in part by FIG. 2, the arrangements are generally similar to those of FIG. 1 and corresponding elements therefore bear the same reference numerals. In this embodiment, however, the isolated electrode 6 of chamber 2 is coupled through a capacitor 9a to the isolated electrode 8 of chamber 3.

Figure 3:
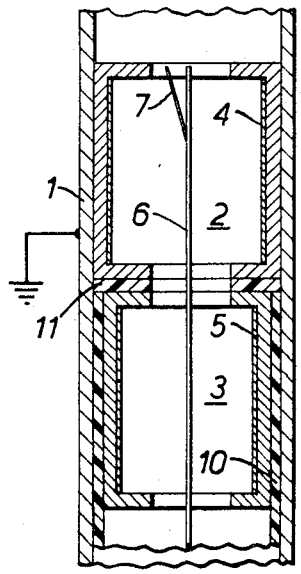
FIG. 3 shows a third embodiment of the invention.

In the embodiment shown in FIG. 3 a single isolated electrode 6 is common to both chamber 2 and chamber 3. Here, however, the outer wall 5 of chamber 3 is separated by a dielectric layer 10 from the casing 1 of the device and by a dielectric annulus 11 from the outer wall 4 of chamber 2, which is electrically connected to the casing 1.

Where complete compensation for gamma radiation dosage is required, so that the reading of the device is related only to the neutron flux, it will be necessary so to construct the device that the charge sensitivities for gamma radiation $q_{1\gamma}$ and $q_{2\gamma}$ of the two chambers will be appropriately related to the ratio of the coupling capacitance to that of the second (or gamma-sensitive) chamber:

$$\frac{q_{1\gamma}}{q_{2\gamma}} = (C_c/C_c + C_2)$$

We claim:

1. In an ionization dosimeter comprising a first ionization chamber including an outer electrode and an isolated inner electrode, said chamber having a predetermined ratio of neutron radiation response to gamma radiation response, means for electrically charging said chamber in a predetermined polarity and means for measuring voltage changes between the electrodes of said chamber, the improvement which comprises:

a second ionization chamber including an outer electrode and an isolated inner electrode, said second ionization chamber having a ratio of neutron radiation response to gamma radiation response different from that of said first ionization chamber;

means for electrically charging said second ionization chamber with a polarity opposite to that of said first ionization chamber;

means establishing a direct electrical connection between one pair of corresponding electrodes of said ionization chambers; and capacitance means electrically coupling the other pair of corresponding electrodes of said ionization chambers.

2. The improvement claimed in claim 1 wherein said capacitance means comprises a capacitor connected between said remaining pair of electrodes.

3. The improvement claimed in claim 1, including an electrically conductive member electrically connected to an electrode of one said ionization chamber and electrically insulated from the corresponding electrode of the other said ionization chamber, whereby the capacitance between said conductive member and said corresponding electrode constitutes said capacitance means.

4. The improvement claimed in claim 3 wherein the inner electrode of one said ionization chamber passes into the other said chamber within which it is surrounded by but insulated from a conductive member constituting said corresponding electrode of said other ionization chamber.

5. The improvement claimed in claim 3 including a conductive casing means for said dosimeter electrically connected to said outer electrode of one said chamber, wherein insulating material separates said outer electrode of the other said chamber from said casing means and from said outer electrode of said one chamber.

6. The improvement claimed in claim 1 wherein one of said first and second ionization chambers has an internal wall coating rendering said chamber preferentially sensitive to gamma radiation.

7. The improvement claimed in claim 1 wherein one of said first and second ionization chambers has an internal wall coating rendering said chamber preferentially sensitive to neutron radiation.

8. The improvement claimed in claim 6 wherein the other of said ionization chambers has an internal wall coating rendering said chamber preferentially sensitive to neutron radiation.

9. A dosimeter in accordance with claim 1 wherein said coupling capacitance has a value $C_t$ in accordance with the equation:

$$C_t = \frac{C_2\left(QF\frac{q_{1\gamma}}{q_{1n}} - \right)}{1 + QF\frac{q_{1\gamma}}{q_{1n}}\left(\frac{q_{2\gamma}}{q_{1\gamma}} - 1\right)\frac{q_{2n}}{q_{1n}}}$$

where $C_2$ is the capacitance of the chamber having the lower sensitivity to neutrons;

$q_{2\gamma}$ is the charge sensitivity to gamma radiation of that chamber;

$q_{2n}$ is the charge sensitivity to neutron radiation of that chamber;

$q_{1\gamma}$ is the charge sensitivity to gamma radiation of the chamber which is more sensitive to neutron radiation;

$q_{1n}$ is the charge sensitivity to neutron radiation of that chamber; and $QF$ is the quality factor of the neutron radiation in said field.

10. A dosimeter in accordance with claim 1 wherein said coupling capacitance has a value such that said voltage change is proportional only to the neutron radiation dose received by said dosimeter.

* * * * *